(12) United States Patent
Sicher et al.

(10) Patent No.: US 7,996,868 B2
(45) Date of Patent: Aug. 9, 2011

(54) SYSTEM AND METHOD OF ACCESSING DIGITAL VIDEO BROADCASTS WITHIN AN INFORMATION HANDLING SYSTEM

(75) Inventors: Alan E. Sicher, Austin, TX (US); Shree Dandekar, Round Rock, TX (US); Subramanian Jayaram, Austin, TX (US); James Clardy, Austin, TX (US); Sowmya Swaminathan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 297 days.

(21) Appl. No.: 11/759,026

(22) Filed: Jun. 6, 2007

(65) Prior Publication Data

US 2008/0303955 A1 Dec. 11, 2008

(51) Int. Cl.
*H04N 7/16* (2006.01)

(52) U.S. Cl. .............................. 725/62; 725/86

(58) Field of Classification Search .................... 725/62, 725/86

See application file for complete search history.

(56) References Cited

U.S. PATENT DOCUMENTS

| | | | |
|---|---|---|---|
| 5,911,008 A | 6/1999 | Niikura et al. | |
| 6,057,893 A | 5/2000 | Kojima et al. | |
| 6,714,937 B1 | 3/2004 | Eynon et al. | |
| 7,139,006 B2 | 11/2006 | Wittenburg et al. | |
| 7,466,367 B2 * | 12/2008 | DaCosta | 348/730 |
| 7,548,518 B2 * | 6/2009 | Salo et al. | 370/259 |
| 2003/0063615 A1 * | 4/2003 | Luoma et al. | 370/401 |
| 2003/0229894 A1 | 12/2003 | Okada et al. | |
| 2004/0252246 A1 * | 12/2004 | Lee | 348/725 |
| 2005/0060667 A1 | 3/2005 | Robbins | |
| 2005/0071782 A1 | 3/2005 | Barrett et al. | |
| 2005/0090235 A1 | 4/2005 | Vermola et al. | |
| 2005/0125831 A1 | 6/2005 | Blanchard | |
| 2005/0144632 A1 * | 6/2005 | Mears et al. | 725/15 |
| 2005/0172016 A1 | 8/2005 | Kossi et al. | |
| 2005/0285798 A1 | 12/2005 | Van Wonterghem et al. | |
| 2006/0019618 A1 * | 1/2006 | Seppala | 455/121 |
| 2006/0048208 A1 * | 3/2006 | Sibley et al. | 725/153 |
| 2006/0127032 A1 * | 6/2006 | van Rooyen | 386/37 |
| 2006/0130099 A1 * | 6/2006 | Rooyen | 725/62 |
| 2006/0135195 A1 * | 6/2006 | Leinonen et al. | 455/550.1 |
| 2006/0195872 A1 * | 8/2006 | Seo et al. | 725/87 |
| 2006/0234783 A1 * | 10/2006 | Wang et al. | 455/575.1 |

(Continued)

OTHER PUBLICATIONS

U.S. Appl. No. 11/639,158, filed Dec. 14, 2006.

(Continued)

*Primary Examiner* — Christopher Kelley
*Assistant Examiner* — Mulugeta Mengesha
(74) *Attorney, Agent, or Firm* — Larson Newman, LLP (57) ABSTRACT

A system and method of accessing digital video broadcasts within an information handling system is disclosed. In one form, a digital video broadcast processing system can include a digital video broadcast receiver module operable to process a first digital video broadcast data received within a multiple channel digital video broadcast signal and to output the first digital video broadcast data to an interconnect bus of a computer system. The digital video broadcast processing system can also include a communication interface operable to be removably coupled to an interconnect bus interface of the computer system. The communication interface can be operable to communicate the first digital video broadcast data, including an interconnect dependent data format, from the digital video broadcast receiver module to a digital video processing application of the computer system.

7 Claims, 9 Drawing Sheets

U.S. PATENT DOCUMENTS

| | | | |
|---|---|---|---|
| 2006/0273967 A1 | 12/2006 | Gat et al. | |
| 2007/0028271 A1* | 2/2007 | Ju et al. | 725/62 |
| 2007/0038516 A1 | 2/2007 | Apple et al. | |
| 2007/0052672 A1 | 3/2007 | Ritter et al. | |
| 2007/0089123 A1* | 4/2007 | Park | 725/1 |
| 2007/0101352 A1* | 5/2007 | Rabina et al. | 725/1 |
| 2007/0107015 A1 | 5/2007 | Kazama et al. | |
| 2007/0126857 A1* | 6/2007 | Turtinen | 348/14.01 |
| 2007/0147409 A1* | 6/2007 | Kallio et al. | 370/431 |
| 2007/0214484 A1* | 9/2007 | Taylor et al. | 725/100 |
| 2007/0234396 A1* | 10/2007 | Lee et al. | 725/136 |
| 2007/0243907 A1* | 10/2007 | Jin et al. | 455/566 |
| 2007/0268874 A1* | 11/2007 | Vare et al. | 370/338 |
| 2007/0277214 A1 | 11/2007 | Kim et al. | |
| 2008/0020702 A1* | 1/2008 | Jendbro et al. | 455/3.01 |
| 2008/0022326 A1* | 1/2008 | Chen et al. | 725/81 |
| 2008/0022335 A1 | 1/2008 | Yousef | |
| 2008/0046821 A1* | 2/2008 | Huang | 715/717 |
| 2008/0052753 A1* | 2/2008 | Huang et al. | 725/151 |
| 2008/0086746 A1 | 4/2008 | King | |
| 2008/0092188 A1* | 4/2008 | Rofougaran | 725/111 |
| 2008/0115164 A1* | 5/2008 | Kiiskinen | 725/39 |
| 2008/0189540 A1* | 8/2008 | Jansky | 713/2 |
| 2008/0275960 A1* | 11/2008 | Myllyla et al. | 709/217 |
| 2008/0285579 A1* | 11/2008 | Vare et al. | 370/412 |
| 2008/0307457 A1 | 12/2008 | Yang et al. | |
| 2009/0100462 A1 | 4/2009 | Park et al. | |

OTHER PUBLICATIONS

U.S. Appl. No. 11/377,062, filed Mar. 16, 2006.
U.S. Appl. No. 11/562,185, filed Nov. 21, 2006.
U.S. Appl. No. 11/682,552, filed Mar. 6, 2007.
U.S. Appl. No. 11/559,937, filed Nov. 11, 2006.
U.S. Appl. No. 11/744,926, filed May 7, 2007.
U.S. Appl. No. 11/283,568, filed Nov. 18, 2005.
U.S. Appl. No. 11/221,063, filed Sep. 7, 2005.
U.S. Appl. No. 11/158,981, filed May 30, 2002.
U.S. Appl. No. 10/137,623, filed May 2, 2002.

* cited by examiner

SYSTEM AND METHOD OF ACCESSING DIGITAL VIDEO BROADCASTS WITHIN AN INFORMATION HANDLING SYSTEM

CROSS-REFERENCE TO RELATED APPLICATIONS

This application is related to U.S. patent application Ser Nos. 11/759,016 entitled "System and Method of Accessing Multicast Digital Video Broadcasts" by Dandekar et al. filed on Jun. 6, 2007 and 11/759,024 entitled "System and Method of Enabling Digital Video Broadcast Access within an Information Handling System" by Dandekar et al. filed on Jun. 6, 2007 both of which are assigned to the current assignee hereof and are hereby incorporated by reference in their entireties.

FIELD OF THE DISCLOSURE

This disclosure relates generally to information handling systems, and more particularly to a system and method of accessing digital video broadcasts within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

Some network broadcast systems can configure digital video broadcast information to be communicated to target devices optimized to output specific digital video broadcast signals received from a specific carrier. For example, some portable electronic devices, such as wireless personal digital assistants (PDAs), mobile phones, cellular devices, or various other handheld devices, have limited resources to process and output received digital video broadcast signals. Handset manufacturers can employ carrier specific chipsets and applications within handsets to process and display digital video broadcasts on mini-displays or screens of portable electronic devices. However, limiting reception and display resolution of portable electronic devices and digital video broadcasts may not be desirable to various users.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a digital video broadcast processing system is disclosed. The digital video broadcast processing system can include a digital video broadcast receiver module operable to process a first digital video broadcast data received within a multiple channel digital video broadcast signal and to output the first digital video broadcast data to an interconnect bus of a computer system. The digital video broadcast processing system can also include a communication interface operable to be removably coupled to an interconnect bus interface of the computer system. The communication interface can be operable to communicate the first digital video broadcast data, including an interconnect dependent data format, from the digital video broadcast receiver module to a digital video processing application of the computer system. The digital video broadcast processing system can further include a digital video broadcast processing module located within the computer system and operable to receive the first digital video broadcast data from the digital video broadcast receiver module via the interconnect bus.

According to another aspect of the disclosure, a method of processing digital video broadcast signals is disclosed. The method can include enabling reception of a digital video broadcast signal using a digital video broadcast receiver module coupled to an interconnect bus of a computer system, and receiving the digital video broadcast signal configured to be communicated to a portable handheld electronic device using the digital video broadcast receiver module. The method can also include decoding the digital video broadcast signal to access multiple broadcast channels including a first digital video broadcast data of a first channel. The method can further include formatting the first digital video broadcast data, and outputting the first digital video broadcast data to the interconnect bus of the computer system. In one form, the interconnect bus can be operable to communicate the first digital video broadcast data to a digital video broadcast processing application of the computer system to output the first digital video broadcast data of the first channel using a video output device of the computer system.

According to a further aspect of the disclosure, a digital video broadcast receiver module is disclosed. The digital video broadcast receiver module can include a digital video broadcast receiver operable to receive a digital video broadcast signal, and a digital video decoder operable to decode the digital video broadcast signal. The digital video broadcast receiver module can also include a communication interface operable to be removably coupled to an interconnect bus interface of the computer system. The communication interface can be operable to communicate a first digital video broadcast data including an interconnect dependent data format to a digital video processing application of the computer system.

Figure 1:
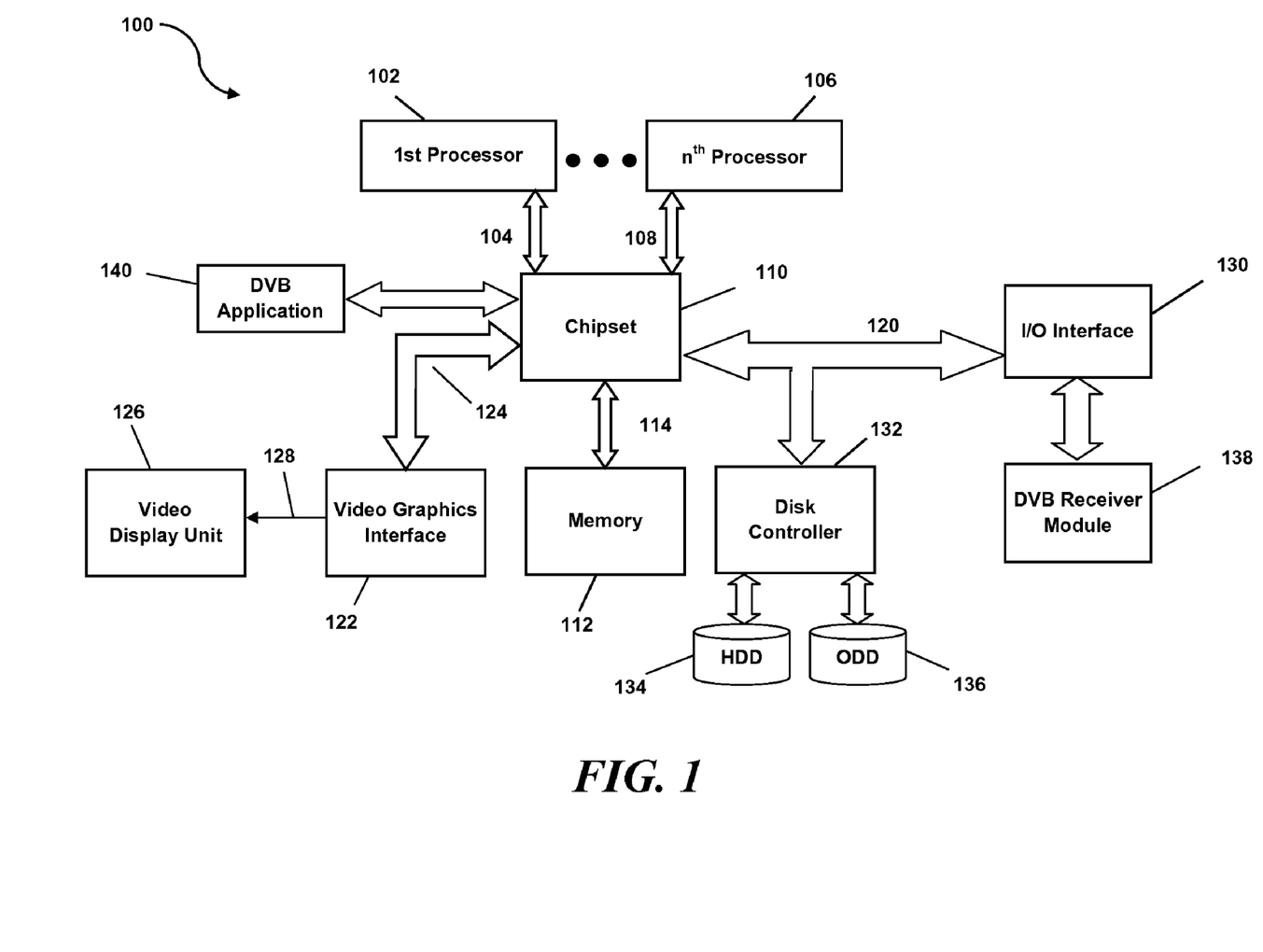
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n<sup>th</sup> physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In one form, the information handling system 100 can include a DVB receiver module 138 coupled to the I/O interface 130 and operable to be used with a DVB application 140 of the IHS 100 to output a DVB broadcast. In one form, a DVB broadcast can include a DVB-H broadcast configured to be received by a handheld device operable to receive and output digital video broadcasts using a mobile handheld device including reduced-sized or mini-displays to display video and textual data. DVB-H broadcasts can be transmitted by wireless carriers using a time-slicing technique that can allow the DVB receiver module 138 to receive DVB data in short intervals, and can turn off or disable a portion of the DVB receiver module 138 during inactive periods. As such, a reduction in battery life of the IHS 100 can be realized. DVB-H broadcasts can also allow reception of video broadcast signals for various broadcast stations, programming, etc. DVB-H broadcasts can also include standardized broadcasts that comply with DVB-H specification DVB-H, published as European Telecommunication Standards Institute (ETSI) Standard EN 302 304 v1.1.1 in November 2004. Other types of broadcasts can also be used as desired, including, but not limited to, Integrated Services Digital Broadcast-Terrestrial (ISDB-T) in Japan, Terrestrial-Digital Multimedia Broadcasting (T-DMB) in Korea and DAB, incl. Digital Audio Broadcasting-Internet Protocol (DAB-IP) and Enhanced Packet mode Digital Audio Broadcasting (DAB) in Europe Middle East Asia (EMEA).

In one form, the DVB receiver 138 can be a removable card or expansion card that can be coupled to the I/O interface 130 as an add-on, or optional accessory or device for the IHS 100. The DVB receiver module 138 can be coupled to the I/O interface 130 and can receive power from the IHS 100 via the I/O interface 130. The DVB receiver module 138 can further include a DVB receiver module driver, software, or logic that can be employed by the IHS 100 and the DVB receiver module 138 to access and use of the DVB receiver module 138 using one or more applications of the IHS 100.

During use, the DVB receiver module 138 can periodically receive a DVB-H broadcast signals from a carrier and convert or decode the DVB broadcast signals to DVB broadcast data that can be formatted and communicated via the I/O interface 130 to the DVB application 140 of the IHS 100. In one form, the DVB broadcast data can be formatted into a communication bus dependent format. For example, the I/O interface 130 can include a PCI Express communication bus and the DVB-H broadcast data can be formatted into a signal that can be communicated via the PCI Express communication bus of the IHS 100. Other types of buses can also be employed as desired. The formatted data can be communicated to the DVB application 140, and the DVB application 140 can process the digital video broadcast information and decode the digital video broadcast data to output using the video display output 126. In this manner, DVB-H broadcast signals can be received by a DVB receiver module 138 coupled to the IHS 100 via an I/O interface and utilize resources of the IHS 100 to output the DVB-H signal data thereby enabling access of DVB-H broadcast data. A reduced amount of resources may be realized within the DVB receiver module 138 thereby allowing for a simplification of processing at the DVB receiver module 138 in some embodiments.

Figure 2:
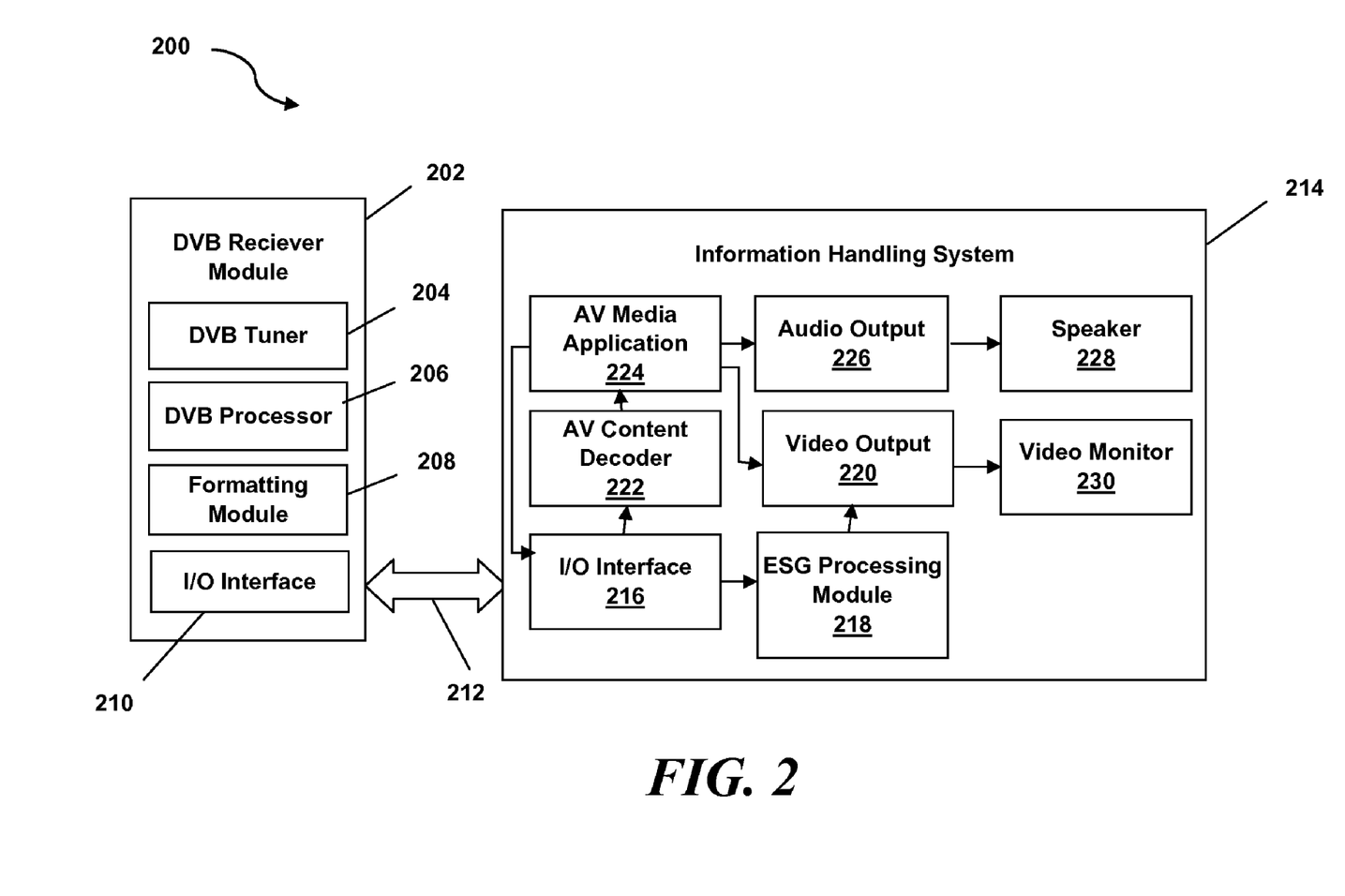
FIG. 2 illustrates a functional block diagram digital video broadcast processing system according to one aspect of the disclosure.

FIG. 2 illustrates a functional block diagram digital video broadcast processing system, illustrated generally as DVB processing system 200, according to one aspect of the disclosure. The DVB processing system 200 can include a DVB receiver module 202 including a DVB tuner 204, a DVB processor 206, a formatting module 208, and an I/O interface 210. The I/O interface 210 can be coupled to an I/O interconnect bus 212 and a second I/O interface 216 of an IHS 214. The IHS 214 can further include an electronic schedule guide (ESG) processing module 218 coupled to a video output 220. The second I/O interface 216 can also be coupled to an audio video (AV) content decoder 222 operable to be coupled to an AV media application 224 of the IHS 214. The AV media application 224 can output an audio signal to the audio output 226 operable to be coupled to at least one speaker 228 of the IHS 214. The AV media application 224 can further output a video signal using a video output 220 operable to be coupled to a video monitor 230 of the IHS 214. The video output 220 can combine the output of the ESG processing module 218 and the AV media application 224. In other forms, the ESG processing module 218 can provide an input to the AV media application 224 to include the ESG data to be output to the video output 220.

Figure 3:
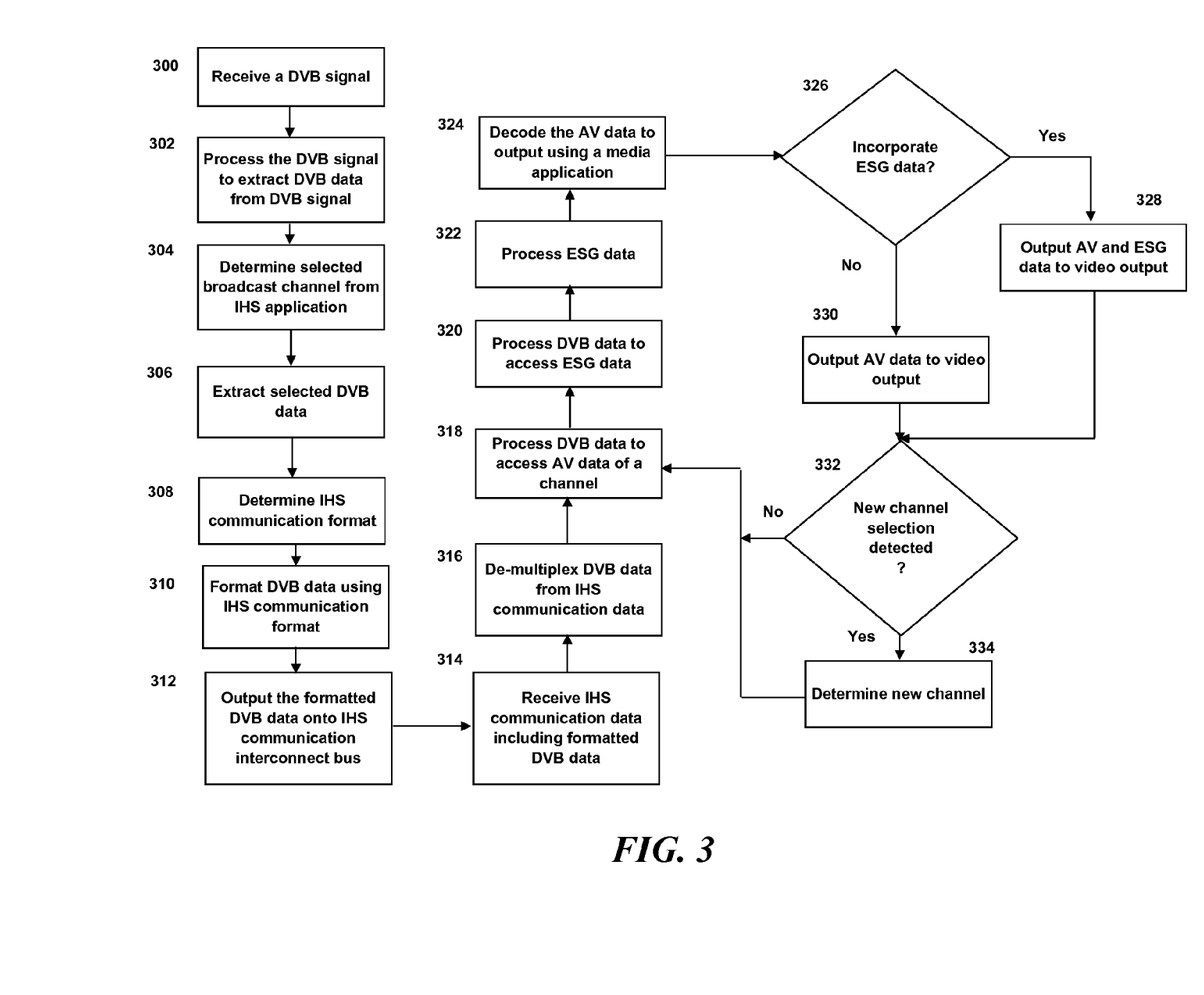
FIG. 3 illustrates a flow diagram of a method of accessing digital video broadcasts using a digital video broadcast processing system according to one aspect of the disclosure.

FIG. 3 illustrates a flow diagram of a method of accessing digital video broadcasts using a digital video broadcast processing system according to one aspect of the disclosure. FIG. 3 can be employed in whole, or in part, by the information handling system 100 depicted in FIG. 1, the DVB processing system 200 described in FIG. 2, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at block 300 as a DVB signal can be received by a DVB receiver module coupled to an information handling system. In one form, the DVB signal can be received for a specific signal carrier, and the method can be modified to receive a specified carriers DVB broadcast signal. Upon receiving the DVB signal, the method can proceed to block 302 and process the DVB signal to extract the DVB data from the DVB signal. For example, the DVB signal can include multiple channel broadcast signal including associated DVB data communicated within a single DVB signal. As such, the multiple channel broadcast data can be extracting from the DVB signal. The method can then proceed to block 304, and determine a selected broadcast channel to access within of the DVB broadcast data to output to the IHS. For example, a single channel can be selected. As such, the DVB data of the selected channel can be extracted from the multiple channel broadcast data. In another form, multiple channels can be extracted from the multiple channel broadcast data as desired. The method can then proceed to block 306 and the selected DVB data can be extracted. For example, the broadcast data can be encapsulated or encoded using a specific type of encapsulation or encoding methodology that can be broadcast or carrier dependent. As such, the broadcast data can be extracted based on encapsulation or encoding of the carrier type, the broadcaster, or any combination thereof.

Upon extracting the selected DVB data, the method can proceed to block 308 and determine a communication format to format the DVB data to communicate to an IHS via an interconnect bus of the IHS. In one form, the DVB data can be formatted within a DVB receiver module prior to communicating the DVB data to an IHS for outputting. The IHS can include a communication protocol specification that can be used to process the DVB data to communicate from the DVB receiver module to a DVB processing application using an interconnect bus of the IHS. As such, the DVB data can be formatted at block 310, and at block 312, output onto a communication interconnect bus of the IHS. In one form, the DVB receiver module can include a driver or other type of encoded logic that can allow for communicating the DVB data to an application of the IHS for outputting the broadcast data. As such, the DVB data can be formatted based on a specific application of the IHS.

According to another aspect, the DVB data can be formatted and output to a PCI-E bus of an IHS. For example, the DVB data can be formatted and inserted into an IP stream including a multi-layer IP transmission signal. In other forms, the DVB data can be formatted and output using various other types of communication buses of an information handling system as desired. As such, the DVB data can be combined with various other types of application data that can be used independent of the method of FIG. 3.

Upon outputting the formatted DVB data onto the IHS communication bus the method can proceed to block 314, the IHS can receive a communication signal or data including the formatted DVB data. The communication signal or data can include a specific communication transport format, such as an MPEG-2 transport stream (TS), or other formats as desired. The DVB data can be received alone, or in combination with other data and encapsulated using the H.264 standard. For example, the communication signal can include one or more H.264 encapsulated data streams that can be transported using an MPEG-2 transport stream. As such, the method can proceed to block 316, and the DVB data can be de-multiplexed to extract the DVB data streams from the IHS communication signal. The method can then proceed to block 318 and process the DVB data to access the audio and visual (AV) data or other type of data including images, text, etc. within the broadcast data. The method can then proceed to block 320 and the DVB data can be processed to access ESG data from the DVB data. The ESG data can include various types of programming information used with the DVB data that can be displayed, compiled, etc. to be output to a program guide, media application, etc. The ESG data can be formatted in XML or other type of data format and processed at block 322 using a format to determine ESG data. The method can then proceed to block 324 and the AV data can be decoded to be output using a media application of the IHS.

Upon decoding the AV data, the method can proceed to block 326 and determine if portions or all of the ESG data should be incorporated to be output using a media application. For example, a media application can output channel identifier data, sponsorship data, broadcast data, or various other types of data that can be output with the AV data via the media application. As such, the method determines any portion of the ESG data should be incorporated with the AV data. In one form, ESG data can include a channel logo that can be accessed in connection with a DVB channel to be output. As such, a channel logo can be output, superimposed, displayed within a specific graphical location of the media application, etc. to indicate a selected DVB channel. If ESG data should be output, the method can proceed to block 328 and the AV data and the ESG data can be output to a video output port to be displayed by the IHS. If at decision block 326, the ESG data should not be output or displayed, or may not be available to be used, the method can proceed to block 330 and outputs the AV data to the video output. The method can then proceed to decision block 332 and if a new channel or broadcast is selected, the method can proceed to block 334 and determines the new channel or broadcast selected. The method can then proceed to block 318 as described above. If a new channel is not selected at decision block 332, the method can proceed to block 318 as described above.

Figure 4:
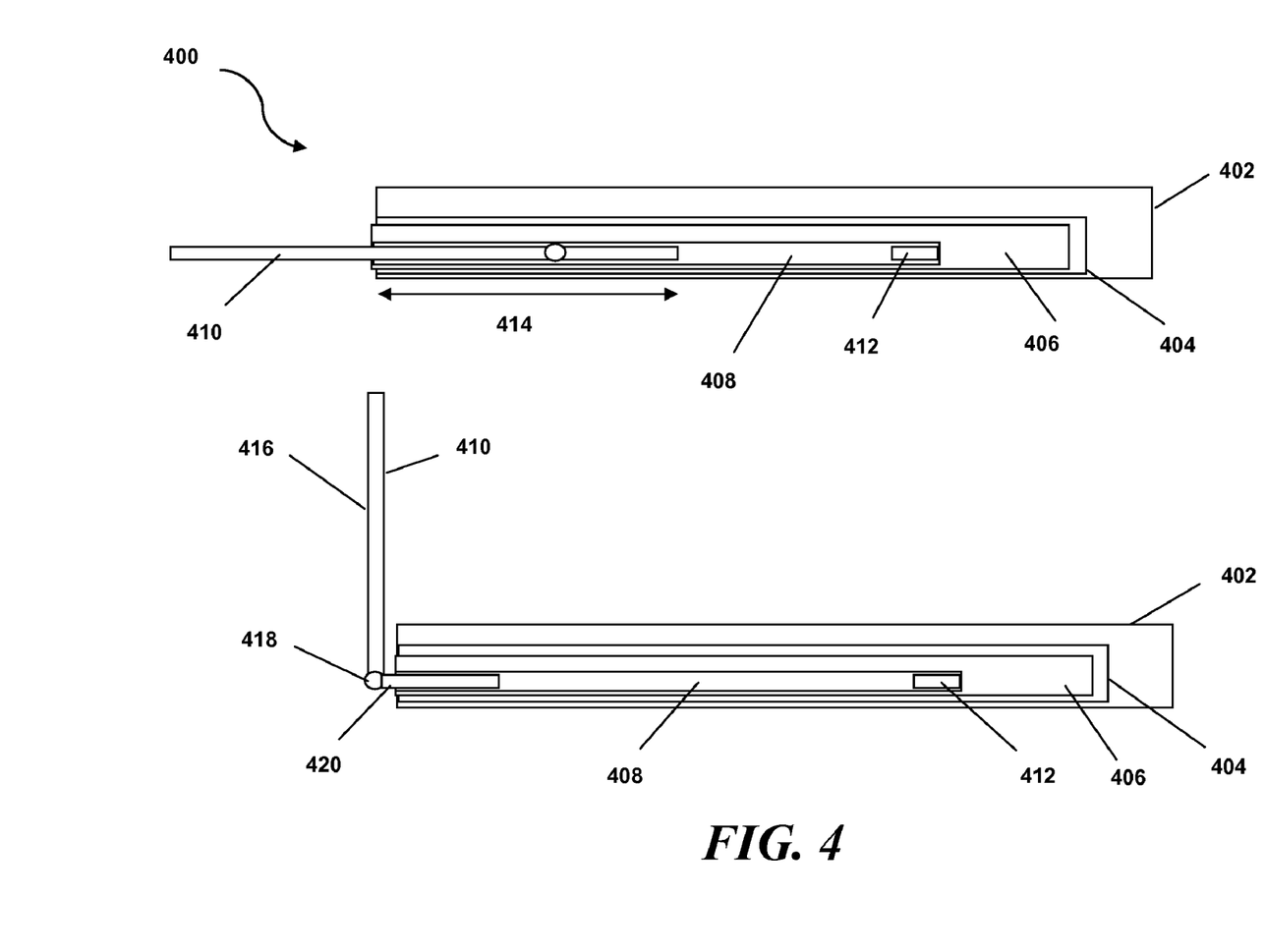
FIG. 4 illustrates a digital video broadcast receiver module incorporating a retractable antenna according to one aspect of the disclosure.

FIG. 4 illustrates a digital video broadcast receiver module incorporating a retractable antenna according to one aspect of the disclosure. An IHS, illustrated generally at 400, can include a portable computer system include a housing 402 having an bus interconnect or interface cavity 404 operable to receive an expansion card such as a digital video broadcast (DVB) receiver module 406. The DVB receiver module 404 can include an antenna cavity 408 formed to receive an ejectable antenna 410 operably coupled to an ejection element 412. The ejection element 412 can be spring or tension activated and used to displace ejectable antenna 410 along a distance 414 of the antenna cavity 408. The ejectable antenna 410 can also include a first member 416 that can be rotated about a rotation element 418 operable to be coupled to a second element 420 of the ejectable antenna 410. The ejectable antenna 410 can be operable to receive DVB signals transmitted by a wireless carrier.

During use, a user can depress first member 416 to compress the ejection element 412 and cause the ejectable antenna 410 to eject from the cavity 408. A user can then move the ejectable antenna 410, as desired, to expose the rotation element 418 and rotate the first member 416 to desired position to receive DVB signals. The DVB signals can be processed end decoded by the DVB receiver module 404. When a user does not desire to use the ejectable antenna 410, a user can rotate the first member 416 to align the ejectable antenna 410 with the cavity 406 and slide the ejectable antenna 410 within the cavity 406 to store as desired.

Figure 5:
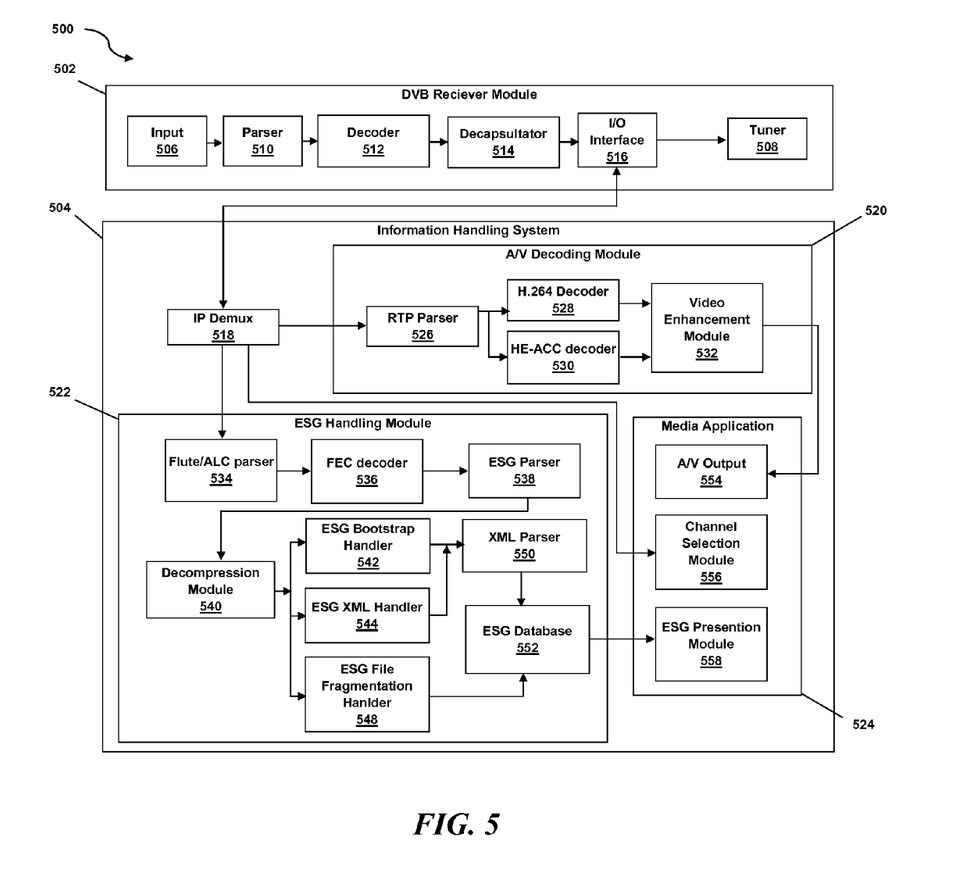
FIG. 5 illustrates of functional block diagram of a digital video broadcast processing system according to another aspect of the disclosure.

FIG. 5 illustrates a functional block diagram of a digital video broadcast processing system according to one aspect of the disclosure. The digital video broadcast processing system, illustrated generally as DVB processing system 500, can include a DVB receiver module 502 coupled to an IHS 504. The digital video broadcast processing system 500 can include an alternate embodiment of the DVB processing system 200 illustrated in FIG. 2. The DVB receiver module 502 can include an input or receiver module 506 operably coupled to a tuner 508 that can be used to selectively receive a DVB signal transmitted by a carrier. Though not illustrated, tuner 508 receives and couples DVB signals received by the DVB receiver module 502 to the input 506. In one form, the tuner 508 can be selectively enabled by the IHS 504 using the I/O interface 516.

The DVB receiver module 502 further includes a parser 510, a decoder 512, a decapsulator 514, and an I/O interface 516. The I/O interface 516 can be coupled to an Internet Protocol (IP) de-multiplexer 518 of the IHS 504. The IP de-multiplexer 518 can receive signals communicated by the I/O interface 516 and can couple portions, or all of a de-multiplexed signal including DVB data to various modules within the IHS 504. For example, the IHS 504 can employ an AV decoding module 520, an ESG handling module 522, and a media application 524. In one form, the AV decoding module 520 can include a real-time protocol (RTP) parser 526, an H.264 decoder 528, a high efficiency advanced audio coding (HE-AAC) decoder 530, and a video correction module 532. The video correction module 532 can make corrections to AV data, as desired, and coupled an AV output to the media application 524.

In one form, the DVB processing system 500 can also include an AV decoding module 520 operable to decode AV data, an ESG handling module 522 operable to process, store and output ESG data. The DVB processing system 500 also includes a media application 524 operable to combine the AV data output from the AV decoding module 520 and the ESG data from the ESG handling module 522 to output to a user of the information handling system 504.

In one form, the ESG handling module 522 can include a flute/ALC parser 534, an FEC decoder 536, an ESG parser 538, and a decompression module 540. The decompression module 540 can be coupled to an ESG bootstrap handler 542, an ESG XML handler 544, and an ESG file fragmentation handler 548. The ESG handling module 522 can also include an XML parser 550, and an ESG database 552. The IHS 504 can also include the media application 524 including an AV output 554, a channel selection module 556, and an ESG presentation module 558. In one form, the channel selection module 556 can be coupled to the tuner 508 via the I/O interface 516 to select a channel to receive and input to the input 506.

According to one aspect, the IHS 504 can include one or more translation code parameter to decode the DVB data received by the DVB receiver module 502. For example, the IHS 504 can store one or more translation code parameters within a memory of the IHS 504 and a user can access the translation code parameters as desired. In this manner, if a format or translation code of DVB data is altered, one or more translation code parameters can be modified to ensure the DVB data can be processed and output by the IHS 504.

Figure 6:
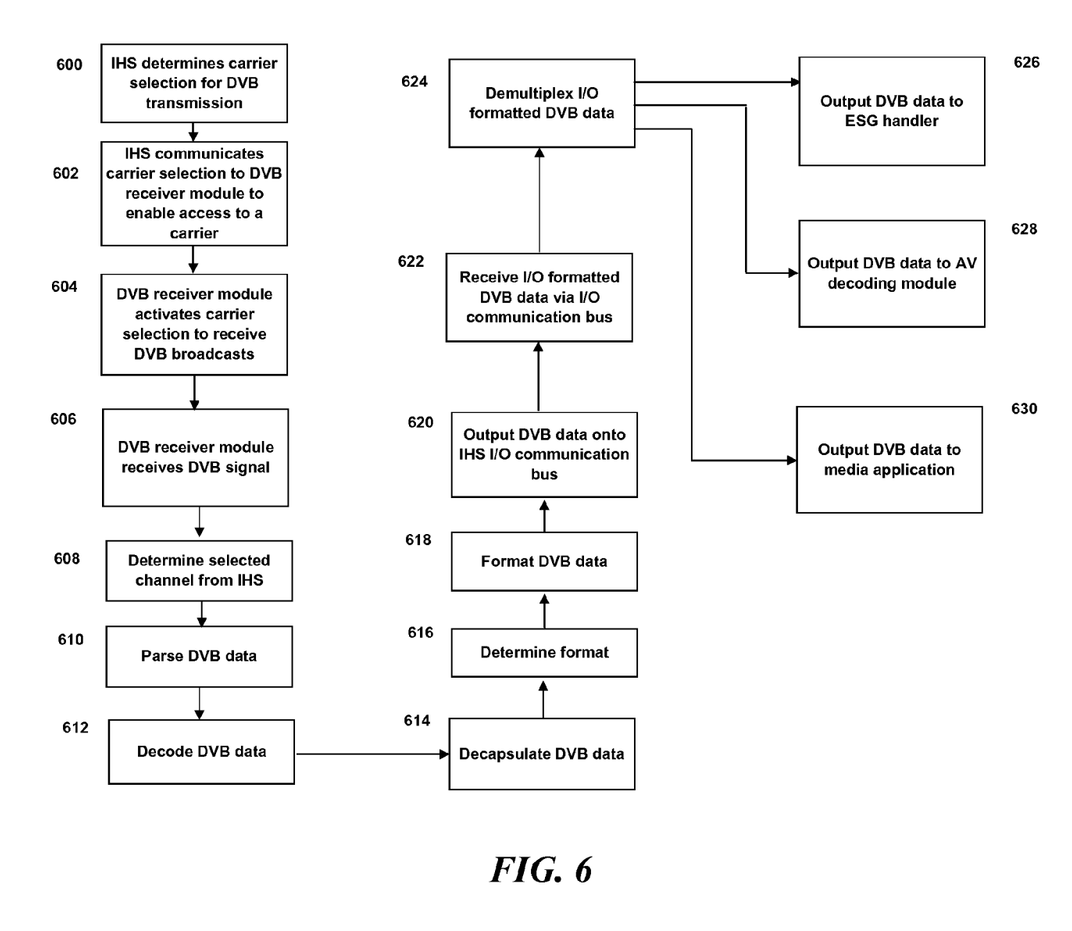
FIG. 6 illustrates a flow diagram of a method of receiving and processing digital video broadcast data according to one aspect of the disclosure.

FIG. 6 illustrates a flow diagram of a method of receiving and processing digital video broadcast data according to one aspect of the disclosure. FIG. 6 can be employed in whole, or in part, by the information handling system 100 depicted in FIG. 1, the DVB processing system 200 described in FIG. 2, the DVB processing system 500 illustrated in FIG. 5, or any other type of system, controller, device, module, processor, or any combination thereof, operable to employ all, or portions of, the method of FIG. 6. Additionally, the method can be embodied in various types of encoded logic including software, firmware, hardware, or other forms of digital storage mediums, computer readable mediums, or logic, or any combination thereof, operable to provide all, or portions, of the method of FIG. 6.

The method begins generally at block 600 as an IHS determines a carrier selection to receive a DVB transmission using a DVB receiver module. For example, the DVB receiver module can include logic to receive DVB broadcast signals from one or more carriers. As such, a DVB receiver module can be operable to receive DVB broadcast signals from one or more carrier and a carrier can be selected by the IHS to receive the DVB signal transmitted by a specified carrier. At block 602, an IHS can communicate a carrier selection to a DVB receiver module, and at block 604, and the DVB receiver module can be activated to receive a specific carrier DVB signal. For example, the an access or carrier reference such as an access key, network, carrier, device identifier, or any combination thereof, can be used to authenticate access to a carrier and an associated DVB signal.

At step 606, the DVB receiver module can receive a DVB signal from the specified carrier. For example, the DVB receive module can receive a DVB signal from the carrier that can include multiple broadcasts or channels within the same DVB signal thereby allowing the DVB receiver module to simultaneously receive multiple channel data.

Upon receiving the DVB signal, the method can proceed to block 608 and the DVB receiver module determines the selected channel selected by the IHS. For example, the IHS can select a first channel to access, and at a subsequent time, can access a second channel upon. However, in other embodiments, more than one channel can be selected to access broadcast data received by the DVB receiver module. As such, the IHS can include a channel selector that can be used to select one or more channels the DVB receiver module can be responsive to the selection and determine one or more channels and associated DVB data to decode.

The method can then proceed to block 610 and the DVB data can be parsed using a parser of the DVB receiver module, and the parsed DVB data can then be decoded at block 612. The method can then proceed to block 614 and the decoded DVB data can be decapsulated 614. Upon decapsulating the DVB data, the method can proceed to block 616 and determine a format to format the DVB data prior to outputting the DVB data to a communication interconnect bus of an IHS.

In one form, at block 616 the format can include inserting the DVB data within an IP stream of a communication interconnect bus of an IHS. The method can then proceed to block 618 and the DVB data can be formatted, and to block 620 and the DVB receiver module can output the formatted data onto an interconnect bus, or I/O communication bus, of the IHS. In one form, the DVB data can be output to a data stream of the IHS, and at block 622 the IHS can receive the data stream via an I/O communication bus interface of the IHS. The method can then proceed to block 624 and the IP stream can be de-multiplexed to access the DVB data. For example, the I/O communication including the DVB data can be de-multiplexed using a de-multiplexing module of the IHS. The method can then proceed to block 626 and the de-multiplexing module can output the DVB data to an ESG handler of the IHS. The de-multiplexing module can also output the DVB data to and AV decoding module, and the de-multiplexing module can output the DVB data to a media application. In one form, the de-multiplexing module can de-multiplexed the formatted I/O formatted DVB data to obtain various types of DVB data and route accordingly. For example, the de-multiplexing module can de-multiples the I/O formatted DVB data and route ESG data to the ESG handler at block 626. Additionally, the I/O formatted DVB data can be de-multiplexed to obtain AV data and the method can proceed to block 628 and outputs the AV data to the AV decoding module. Also, the I/O formatted DVB data can be de-multiplexed to obtain broadcast channel data, and the method can proceed to block 630 and couple the broadcast channel data to the a media output application of the IHS.

Figure 7:
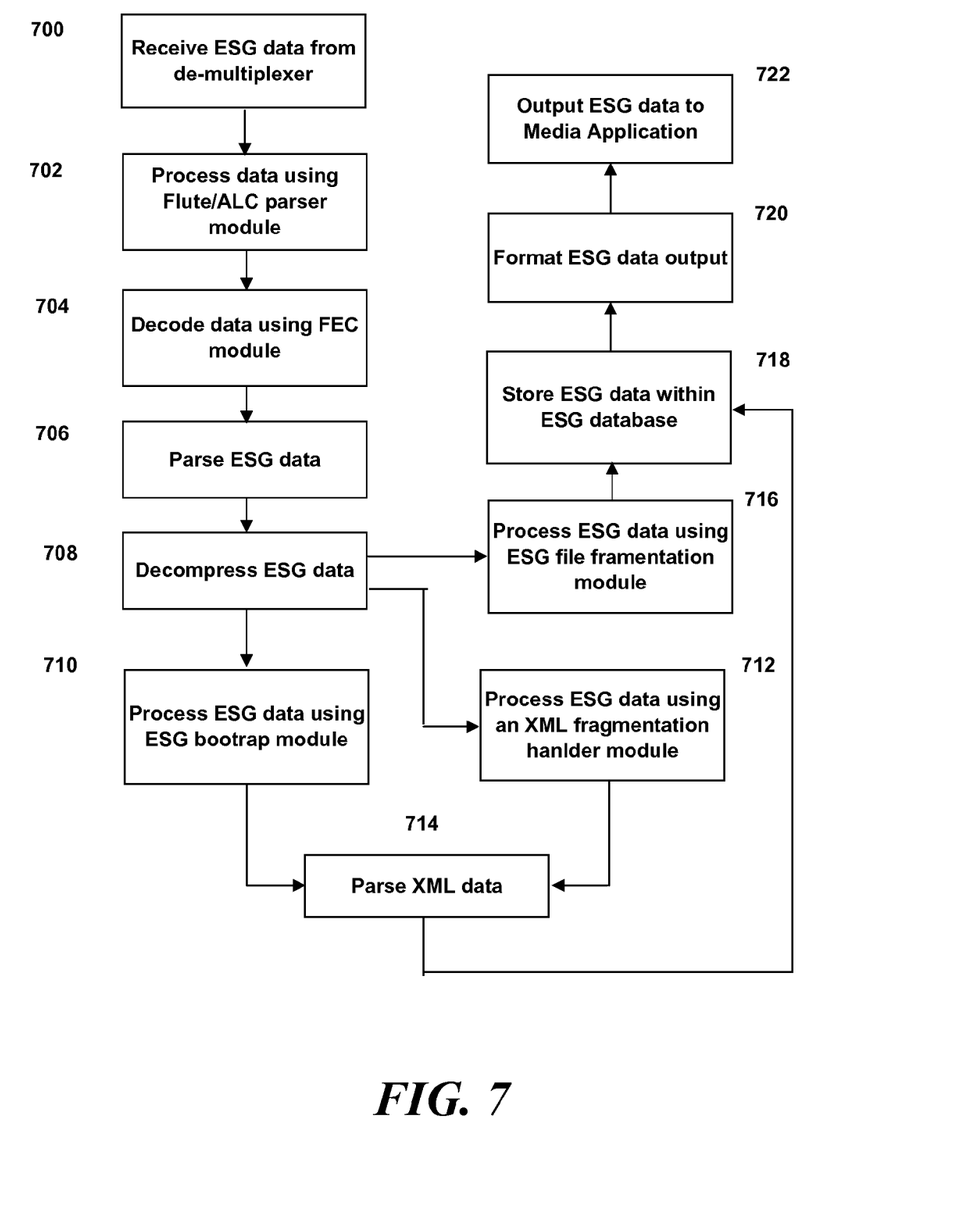
FIG. 7 illustrates a flow diagram of a method of processing electronic service guide (ESG) data according to one aspect of the disclosure.

FIG. 7 illustrates a flow diagram of a method of processing ESG data within an information handling system according to one aspect of the disclosure. FIG. 7 can be employed in whole, or in part, by the information handling system 100 depicted in FIG. 1, the DVB processing system 200 described in FIG. 2, the DVB processing system 500 illustrated in FIG. 5, or any other type of system, controller, device, module, processor, or any combination thereof, operable to employ all, or portions of, the method of FIG. 7. Additionally, the method can be embodied in various types of encoded logic including software, firmware, hardware, or other forms of digital storage mediums, computer readable mediums, or logic, or any combination thereof, operable to provide all, or portions, of the method of FIG. 7.

The method begins generally at block 700 and can be used with the ESG handling module 522 of FIG. 5 as the ESG handling module receives ESG data from a de-multiplexer. In one form, DVB data can be received from the de-multiplexer and the ESG data can be processed to access the ESG data. The method can then proceed to block 702 and the ESG data can be processed using a file delivery over unidirectional transport (FLUTE) protocol/asynchronous layered coding (ALC) parser module. FLUTE can include a protocol for the unidirectional delivery of files of the Internet, which within multicast networks. ALC employed with FLUTE include a protocol that can bus used for massively scalable multicast distribution of files.

The method can then proceed to block 704 and decodes the ESG data using an forward error correction (FEC) module. An FEC module can add redundant data to a message to allow the receiver to detect and correct errors without having to request the data from the sender if not obtained. For example, data can be lost in mobile environments and an FEC module and data can be used to replace data that may be lost or not received.

The method can then proceed to block 706 and parses the ESG data. In one form, the ESG data can be received in a hierarchical arrangement. For example, the ESG data can be received beginning with ESG bootstrap information and periodically updated to add additional ESG data that can include channel, program, event, or any combination of data thereof in excess of the ESG bootstrap information.

For example, an ESG parser can be used to extract time, program, and channel information from an XML data schema of one or more broadcast channels. Upon parsing the ESG data, the method can proceed to block 708 and decompresses the ESG using a decompression algorithm, such as a ZIP, GZIP, or other type of decompression algorithm. The decompressed data can then be processed at block 710 using an ESG bootstrap module. For example an ESG bootstrap module can be operable to output a channel call sign or identifier without having to obtain a complete program data availability.

The decompressed data can also be processed at block 712 using an XML fragmentation handler module operable to recover XML data that can include event and program data in an hierarchical arrangement as received by the DVB receiver module. The ESG data processed at blocks 710 and 712 can be coupled to an XML parser at block 714 to extract ESG data formatted in an XML data format. The method can then proceed to block 718 and the XML data parsed from the ESG data can be stored within an ESG database and accessed as desired.

Additionally, at block 708, the decompressed data can be processed at block 716 using an ESG file fragmentation module operable to recover event and program information from a portion of the ESG data to be used to tune or change channels. The method can then proceed to block 718 and the ESG file data can be stored within the ESG database. Upon storing information within the ESG database, the method can proceed to block 720 and the ESG data can be formatted to be output to a media application. For example, the ESG data can be formatted to using a data format that can be employed by the media application. Upon the ESG data being formatted, the method can proceed to block 722 and the ESG data can be output to the media application and presented to a user as desired.

Figure 8:
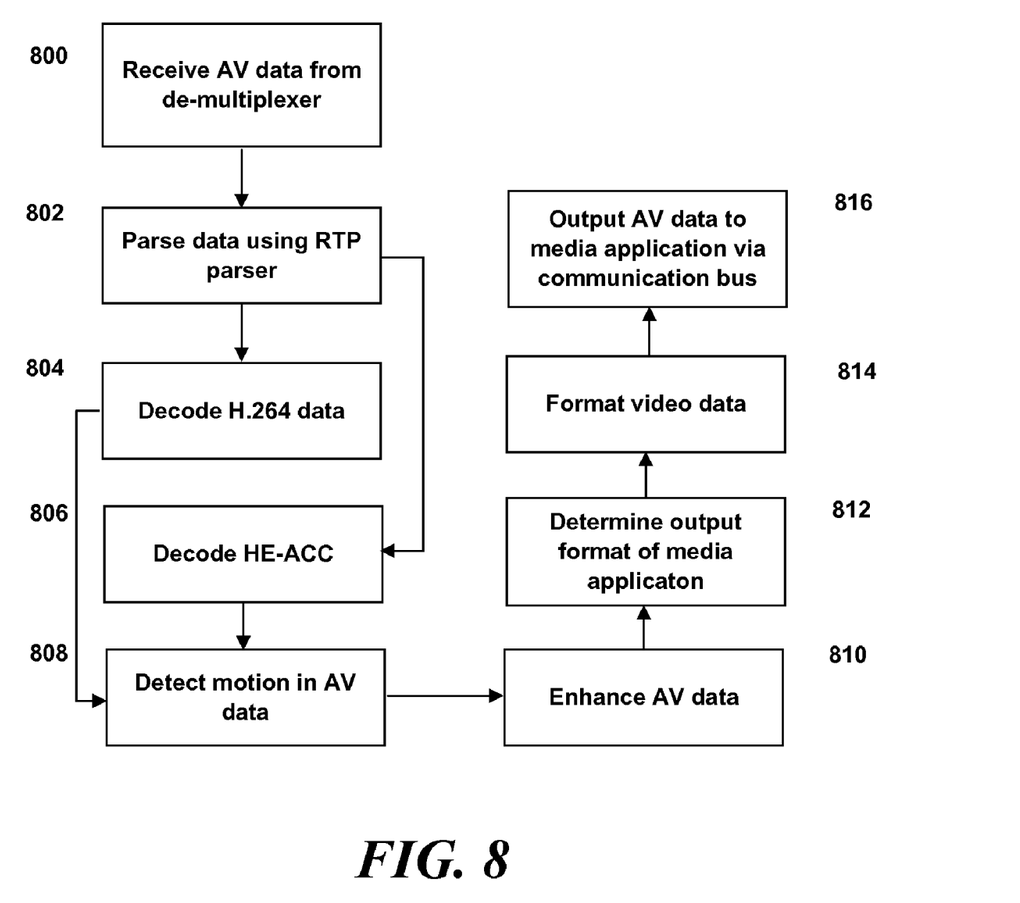
FIG. 8 illustrates a flow diagram of a method of processing broadcast data according to one aspect of the disclosure.

FIG. 8 illustrates a flow diagram of a method of processing broadcast data according to one aspect of the disclosure. FIG. 8 can be employed in whole, or in part, by the information handling system 100 depicted in FIG. 1, the DVB processing system 200 described in FIG. 2, the DVB processing system 500 illustrated in FIG. 5, or any other type of system, controller, device, module, processor, or any combination thereof, operable to employ all, or portions of, the method of FIG. 8. Additionally, the method can be embodied in various types of encoded logic including software, firmware, hardware, or other forms of digital storage mediums, computer readable mediums, or logic, or any combination thereof, operable to provide all, or portions, of the method of FIG. 8.

The method begins generally at block 800 as AV data by an AV decoding module such as the AV decoding module 520 illustrated in FIG. 5 as AV data is received from a demultiplexer module of an IHS. In one form, the demultiplexer module can output DVB data and the DVB data can be processed to access the AV data and provide at block 800. Upon receiving the AV data, the method can proceed to block 802 and the AV data can be input to an RTP parser and parsed. For example, the AV data can be accessed from a transport stream, such as an MPEG-2 transport stream (TS), or other formats as desired. The DVB data can be received alone, or in combination with other data and encapsulated using the H.264 standard. For example, the AV data can include one or more H.264 encapsulated data streams that can be transported using an MPEG-2 transport stream and upon parsing the data at block 802 the method can proceed to block 804 and decapsulate or decode the AV data stream using an H.264 decoder. Upon decoding using an H.264 decoder, the method can proceed to block 808 as described below. At block 802, the parsed AV data can also be processed to decode HE-AAC data within the AV data. For example, an HE-AAC module can be used to process audio data of the AV data.

The method can then proceed to block 808 and the decoded AV data can be processed to determine motion within the video. For example, video frames that include motion or increased frame display rates, increasing display rate or resolution of a video output may be desired. As such, the method can proceed to block 810 and the AV data can be enhanced using a motion compensation or frame-rate correction module or algorithm. The method can then proceed to block 812, and an output format of a media application can be determined to format the AV data for output. The method can then proceed to block 814 and the AV data can be formatted for outputting. For example the AV data can be formatted to be output using as Windows Media Player by Microsoft Corporation, Cyberlink's H.264 player, or various other H.264 players. The method can then proceed to block 816 and the AV data can be output using a media application of the IHS.

Figure 9:
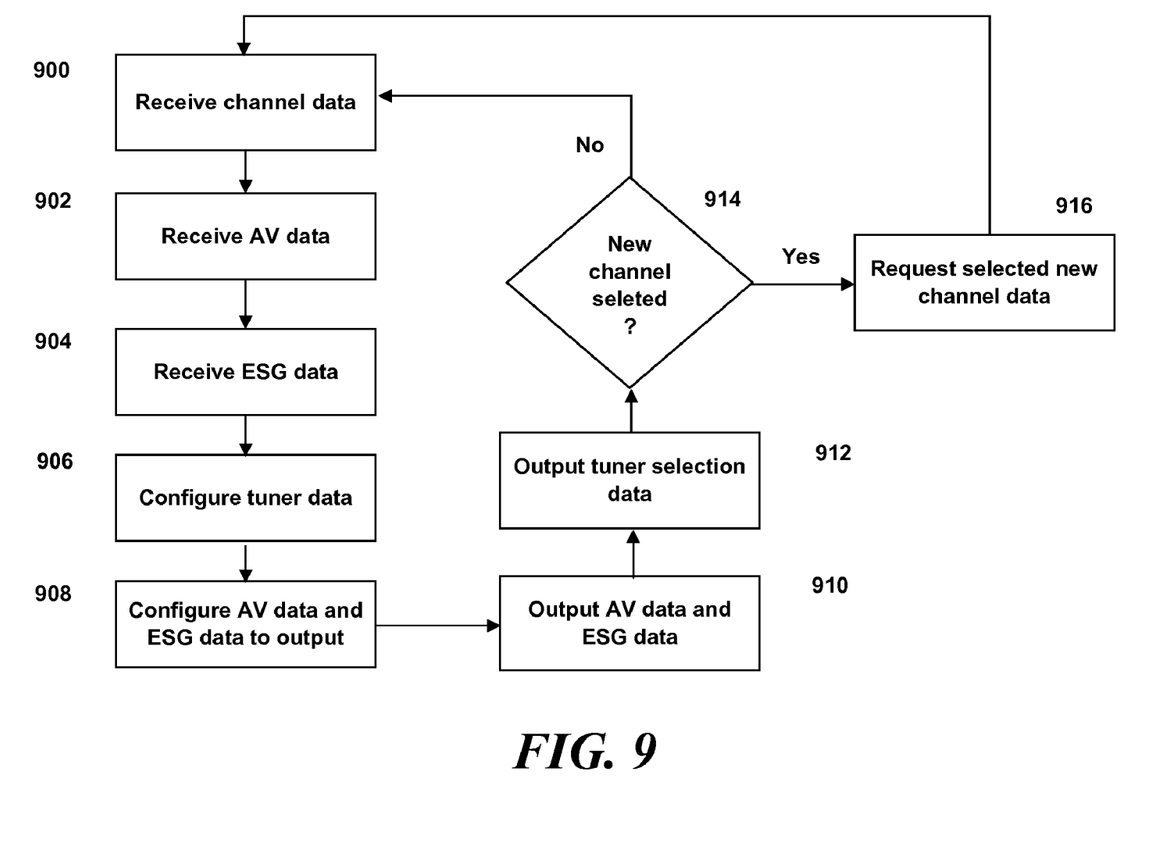
FIG. 9 illustrates a flow diagram of a method of outputting digital video broadcast data according to one aspect of the disclosure.

FIG. 9 illustrates a flow diagram of a method of outputting digital video broadcast data according to one aspect of the disclosure. FIG. 9 can be employed in whole, or in part, by the information handling system 100 depicted in FIG. 1, the DVB processing system 200 described in FIG. 2, the DVB processing system 500 illustrated in FIG. 5, or any other type of system, controller, device, module, processor, or any combination thereof, operable to employ all, or portions of, the method of FIG. 9. Additionally, the method can be embodied in various types of encoded logic including software, firmware, hardware, or other forms of digital storage mediums, computer readable mediums, or logic, or any combination thereof, operable to provide all, or portions, of the method of FIG. 9.

The method begins generally at block 900 as channel data to be output by a media application can be received by a media application such as the media application 524 illustrated in FIG. 5. For example, channel data can include a DVB channel data that can be displayed by a media application of an IHS to identify a channel being output via the media application. In one form, the channel data can include multiple channel data that can be displayed within the media application and accessible to be selected to access additional programming or broadcast channels. Upon receiving channel data, the method can proceed to block 902, and AV data can be received. For example, AV data can be output in response to a selected channel within a video output display of the IHS. As such, AV data can be received at block 902. Additionally, at block 904, ESG data can be received to be output by the media application. In one form, the method can be modified to receive portions, all, or various combinations of, the channel data, AV data, and ESG data as desired.

The method can proceed to block 906, and tuner data can be configured to be displayed or activated within the media application to enable a user to select one or more channels to be accessed. For example, the tuner data can include a list of each available broadcast channel and the media application can configure the tuner data to be displayed and selected as desired. The method can then proceed to block 908 and the AV data and ESG data can be configured to be displayed using an output of the media application. The method can then proceed to block 910 and the configured AV data and ESG data can be output using a display device of the IHS. The method can then proceed to block 912 and the tuner selection data can be also be output. If at decision block 914, a new channel is not selected, the method can proceed to block 900 and repeats. If at decision block 914, a new channel is selected, the method can proceed to block 916 and the new channel data can be requested. The method can proceed to block 900 and new channel data can be received in response to the request.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of processing digital video broadcast signals, the method comprising:
enabling reception of a digital video broadcast signal using a digital video broadcast receiver module coupled to an interconnect bus of a computer system;
receiving the digital video broadcast signal configured to be communicated to a portable handheld electronic device using the digital video broadcast receiver module;
decoding the digital video broadcast signal to access multiple broadcast channels including a first digital video broadcast data of a first channel;
formatting the first digital video broadcast data;
outputting the first digital video broadcast data to the interconnect bus of the computer system, the interconnect bus operable to communicate the first digital video broadcast data to a digital video broadcast processing application of the computer system to output the first digital video broadcast data of the first channel using a video output device of the computer system;
accessing a translation code parameter to decode the first digital video broadcast data using the computer system;
modifying the translation code parameter via the computer system;
receiving the digital video signal including the first video broadcast data; and
decoding the first digital video broadcast data using the modified translation code parameter.

2. The method of claim 1, further comprising:
receiving the first digital video broadcast data at a de-multiplexer coupled to the interconnect bus;
de-multiplexing the first digital video broadcast data using the de-multiplexer to output de-multiplexed data including the first digital video broadcast data;
coupling the de-multiplexed data including the first digital video broadcast data to an electronic service guide (ESG) handling module;
coupling the de-multiplexed data including the first digital video broadcast data to an audio and video decoding module;
coupling the de-multiplexed data including the first digital video broadcast data to a media application.

3. The method of claim 2, further comprising:
enabling a channel selection feature within the media application;
altering a channel availability of the channel selection feature using ESG data output by the ESG handling module; and
initiating a channel selection request to access a second digital video broadcast channel of the digital video broadcast signal.

4. The method of claim 1, further comprising:
receiving multiple channel data within the digital video broadcast signal;
determining a selection of at least a first channel of the multiple channel data from a media application of the computer system;
enabling access to the selected first channel to output from the digital video broadcast receiver module to the interconnect bus; and
outputting the first digital video broadcast data in response to enabling access to the first channel.

5. The method of claim 4, further comprising:
receiving a request to access a second channel of the multiple channel data from the media application of the computer system;
formatting the first digital video broadcast data and a second digital video broadcast data using the digital video broadcast receiver module; and
outputting the formatted first digital video broadcast data and the formatted second digital video broadcast data onto the communication bus.

6. The method of claim 1, further comprising:
determining an available carrier transmitting the digital video broadcast signal;
initiating access to the available carrier using the computer system; and
enabling access to the digital video broadcast signal at the digital video broadcast receiver module in response to initiating access to the available carrier.

7. The method of claim 1, further comprising:
extracting multiple channel data from the digital video broadcast signal including a multicast DVB-H signal configured to be received by a portable electronic device;
formatting the multiple channel data to output via the interconnect bus of the computer system;
outputting the multiple channel data onto the interconnect bus;
receiving the multiple channel data at a de-multiplexer of the computer system; and
decoding the multiple channel data to display the first video broadcast data of a first channel using a video output device of the computer system.

* * * * *